Patented Sept. 16, 1924.

1,508,900

UNITED STATES PATENT OFFICE.

WILLIAM STOCKS, OF FITZROY, VICTORIA, AUSTRALIA.

PROCESS FOR PRODUCING A COMPOSITION OF MATTER FOR USE IN LIEU OF RUBBER, LEATHER, OR FOR OTHER SUITABLE PURPOSES.

No Drawing. Original application filed November 8, 1918, Serial No. 261,734. Divided and this application filed October 21, 1920. Serial No. 418,581.

*To all whom it may concern:*

Be it known that I, WILLIAM STOCKS, a subject of the King of Great Britain, residing at Fitzroy, in the State of Victoria, Commonwealth of Australia, have invented certain new and useful improvements in processes for producing a composition of matter for use in lieu of rubber, leather, or for other suitable purposes, of which the following is a specification.

This invention has been devised to provide an improved process of producing a composition of matter which in the arts or manufactures can be employed as a substitute for rubber and leather and adaptable with certain modifications for use for purposes other than that to which rubber and leather are at present employed.

The present application is a division of my application filed November 8, 1918, Serial No. 261,734.

I shall by way of instance describe the improved process of manufacture when applied to the production of a bulk material to be used as a substitute for rubber or alternatively by slight alterations for leather and for floor cloth.

In carrying out my invention, I first employ old vulcanized rubber, which I place on a grinding machine and through the action of such machine and the application of heat, which must be powerfully driven owing to the frictional resistance and the application of heat, the said rubber is reduced to a comminuted state; the resultant product being in a partial plastic state which is attributed to the throwing off of the sulphur contained therein due to the application of heat during the grinding thereof, and with the vulcanizing agent and rubber in a partially separated condition, the resultant product being then placed on one side to form a stock material to be drawn from as required, as will be hereinafter explained.

I next employ a pair of heated mixing rollers and take a portion of virgin rubber or pure rubber of any kind. This is placed upon the said mixing rolls, the revolving action of which latter causes the pure rubber to be thoroughly masticated into a plastic mass. To this mass while being subjected to the action of the heating rollers I add sulphur in sufficient quantity to produce vulcanization of the pure rubber, when subjected to heat in the usual process of vulcanizing, the proportions and the degrees of heat being well known to those skilled in the rubber manufacturing trade. When the rubber and sulphur are thoroughly mixed together the mass is removed from the action of the mixing rollers.

The ground vulcanized rubber stock, the pure or virgin rubber with the sulphur added thereto form the basis to manufacture any of the following articles and in such varied proportions as may be required to obtain the necessary result: for instance, for first-class rubber goods, motor tyre rubber, and all other articles requiring as a basis a material equal to pure rubber in elasticity or resiliency and strength. To obtain this material, which is in actual fact to form a high grade motor tyre rubber and the like, I take about 1 lb. of pure rubber, about 5 ozs. of sulphur, and about 1 lb. of the said reduced vulcanized rubber stock, or in the proportion of approximately five parts of sulphur to sixteen parts of pure rubber and devulcanized rubber stock. In practice these are placed on the mixing mill and worked into a plastic mass or dough by the action of the revolving rollers, preferably under a heated condition. When the resultant mass is sufficiently plastic and in a sufficient quantity, it is drawn out from the mill in sheet form, preferably of about 1/32" thickness or less. This sheet is rolled up on itself as it leaves the rollers and is then placed in a darkened store room, where it will be free from draughts for a few days to permit of its solidifying and curing.

This matter forms the stock from which to draw supply to manufacture the best grade articles down to the poorest quality articles required.

According to the improved process for the production of the composition of matter as required for floor covering and analogous purposes, I take in proportion by weight 10 lbs. of the hereinbefore mentioned stock, and place this on heated revolving rollers. To this I add 5 lbs. of Pontianac gum, a material well known in the rubber manufacturing trade, or in lieu of the Pontianac gum, an equivalent quantity of a good clear viscous gum. During the process of mixing in the revolution of the rollers, I add half a pint of castor oil and also dredge therein 4 lbs. of ground fibre, resulting from old motor tyre canvas, or any other analogous suitable fibrous material. I then add 2 lbs. of ordinary white lead of commerce, and about half a pint of resin, the latter having been dissolved in a sufficient melting quantity of benzine or corresponding hydrocarbon. These ingredients are well blended, kneaded, and associated together on the said mixing rollers, and any suitable colouring medium added to tint the mixture to the required appearance.

When the ingredients hereinbefore mentioned are thoroughly mixed into a homogeneous plastic mass or dough of a soft nature, the resultant is placed on calendering rolls, the material being fed between the top one of three rollers and the centre one, and passes around the centre roller and out between the bottom two in sheet form, the sheet passing forward through the well-known sulphur bath.

The sulphur bath causes the material to vulcanize and the sheet is lead on to a table, the surface of which is constructed of wire gauze. After the required length of sheet is obtained it is cut from the calendering machine and removed to another table and thoroughly washed with water containing a little caustic soda. From this bath the sheet is rinsed off with clean flowing water and thoroughly dried.

The sheet last mentioned is intended, and will then be found suitable, for a covering for the floor for dwellings and other places, it being obvious that its dimensions will be according to the quantity of material supplied to the calendering rollers. Any painted or diversified pattern required can be given to the sheet by passing it under the necessary printing machine.

The sheet may be varnished with the ordinary copal or rubber varnish, and the sheet of flooring material will then be found to be completely satisfactory for all general purposes. Where a finer material is intended to be used, as a substitute for leather, in the manufacture of boot soles, heels or the like, I may take the material and with an additional quantity of fibrous material pass the said material through the calendering rolls in sheets of about $\frac{1}{16}$th" thickness, and lead it out on to a long table, the surface of the latter consisting of galvanized iron, and when the necessary measurements of each sheet are obtained, it is cut away from the calendering rollers into squares and the thin sheets laid upon one another alternatively at right angles to the direction of the plane of the action of the calendering rollers, so that the elongation of the grain of each sheet caused in the rolling will lie in opposite directions to the sheet above or below same. Thus a thickness may be built up to say one quarter or even one half of an inch, and the number of squares thus arranged being then carefully placed under a press and submitted to a heavy pressure, the latter being according to the density of the material required. The top and bottom plates of the press are jacketed and heated by dry steam at a pressure of about 60 lbs. to the square inch for about ten minutes. The heat vulcanizes and unifies the sheets and other materials into a homogeneous dense flexible material suitable for boot soles, imitation morocco, and other numerous leather-like articles, according to colour and taste.

When the material is required in place of leather the said Pontianac or alternative light gums may be left out of the composition, but in place thereof I would add by weight 3 lbs. of the finest ground flour of leather.

The amount of sulphur hereinbefore mentioned as required for the vulcanizing of the materials may be varied to obtain a greater or lesser density or hardness in the material as may be required for the particular goods or the degree of elasticity or resiliency required in the material for its purpose in the arts or manufactures.

What I do claim is:

1. The process of producing a new composition of matter, consisting of comminuting old or waste vulcanized rubber under heated conditions, blending virgin rubber therewith by mastication and the application of heat to form a plastic mass, and adding to the plastic mass during the masticating thereof white lead, castor oil, viscous gum and dissolved resin as and for the purpose set forth.

2. The process of producing a new composition of matter, consisting in comminuting old or waste vulcanized rubber under heated conditions, blending therewith virgin rubber and sulphur by rolling the ingredients into a plastic mass under heated conditions, and adding white lead, castor oil, Pontianac gum and dissolved resin to the plastic mass as and for the purpose specified.

3. The process of producing a new composition of matter, consisting in grinding old or waste vulcanized rubber under heated conditions into a comminuted condition, taking sixteen parts of said ground material and blending therewith sixteen parts of pure rubber and five parts of sulphur by mixing the ingredients into a plastic mass under heated conditions, then taking ten parts of the aforesaid mixture and mixing therewith five parts of a viscous gum, substantially as and in the manner set forth.

4. The process of producing a new composition of matter, consisting in grinding old or waste vulcanized rubber under heated conditions into a comminuted condition, taking sixteen parts of said ground material and blending therewith sixteen parts of pure rubber and five parts of sulphur by mixing the ingredients into a plastic mass under heated conditions, then taking ten parts of the aforesaid mixture and mixing therewith five parts of a viscous gum and one part of castor oil, substantially as and in the manner set forth.

5. The process of producing a new composition of matter consisting in grinding old or waste vulcanized rubber under heat into comminuted condition, blending therewith virgin rubber and flowers of sulphur by mixing the ingredients into a plastic mass, and then adding to the plastic mass a viscous gum, substantially as and in the manner set forth.

6. The process of producing a new composition of matter consisting in grinding old or waste vulcanized rubber under heat into a comminuted condition, blending therewith virgin rubber and sulphur by mixing the ingredients into a plastic mass, then adding to the plastic mass a viscous gum and castor oil and dredging into the mass ground fibrous material, substantially as and in the manner set forth.

7. The process of producing a new composition of matter consisting in grinding old or waste vulcanized rubber under heat into a comminuted condition, blending therewith virgin rubber and sulphur by mixing the ingredients into a plastic mass, then adding to the plastic mass a viscous gum, white lead and resin dissolved in a hydrocarbon substantially as and in the manner set forth.

8. The process of producing a new composition of matter consisting in grinding old or waste vulcanized rubber under heat into a comminuted condition, blending therewith virgin rubber and sulphur by mixing the ingredients into a plastic mass, then adding to the plastic mass a viscous gum, white lead and resin dissolved in a hydrocarbon, rolling said plastic mass into sheet form, subjecting the sheet to a sulphur bath, then washing and thoroughly drying the sheet, substantially as and in the manner set forth.

In testimony whereof I affix my signature in presence of two witnesses.

WILLIAM STOCKS.

Witnesses:
JOHN BAXTER,
H. C. STODDARD.